United States Patent [19]
Cree et al.

[11] Patent Number: 5,603,086
[45] Date of Patent: *Feb. 11, 1997

[54] DYNAMIC ADDRESS ALLOCATION WITHIN RF TRUNKING MULTISITE SWITCH

[75] Inventors: Timothy F. Cree; Charles P. Brame; Win A. Imron, all of Forest, Va.

[73] Assignee: Ericsson Inc., Research Triangle Park, N.C.

[*] Notice: The term of this patent shall not extend beyond the expiration date of Pat. No. 5,276,442.

[21] Appl. No.: 59,670

[22] Filed: May 12, 1993

Related U.S. Application Data

[63] Continuation of Ser. No. 658,843, Feb. 22, 1991, Pat. No. 5,276,442.
[51] Int. Cl.[6] .................................................. H04Q 7/28
[52] U.S. Cl. .................... 455/34.1; 455/56.1; 370/341; 340/825.52
[58] Field of Search .................. 455/34.1, 34.2, 455/53.1, 17, 54.1, 56.1; 370/85.7, 95.1; 340/825.07, 825.08, 825.5, 825.52; 375/85.1, 85.2, 85.3, 85.4, 94.1

[56] References Cited

U.S. PATENT DOCUMENTS

| | | | |
|---|---|---|---|
| 4,680,583 | 7/1987 | Grover | 455/34.1 |
| 4,718,108 | 1/1988 | Davidson et al. | 455/17 |
| 4,825,204 | 4/1989 | Nakamura | 340/825.52 |
| 4,870,408 | 9/1989 | Zdunek et al. | 455/34.1 |
| 5,077,828 | 12/1991 | Waldroup | 455/34.1 |
| 5,101,502 | 3/1992 | Felderman et al. | 455/53.1 |
| 5,123,110 | 6/1992 | Grube | 455/34.1 |
| 5,124,985 | 6/1992 | Hoshikawa | 370/95.3 |
| 5,276,442 | 1/1994 | Cree et al. | 340/825.52 |
| 5,283,571 | 2/1994 | Yang et al. | 340/825.52 |

OTHER PUBLICATIONS

Comer, E. Douglas "Internetworking with TCP/IP" vol. I pp. 75–76, Prentice–Hall Inc, 1991.

Primary Examiner—Reinhard J. Eisenzopf
Assistant Examiner—Thanh Le
Attorney, Agent, or Firm—Nixon & Vanderhye P.C.

[57] ABSTRACT

A multisite network switch for a series of RF digital trunked radio transceivers and dispatcher consoles. The switch establishes audio communications between different sites and various dispatcher consoles. The multisite switch has a distributed architecture in which each node of the switch is supported by a microprocessor controlled card. These nodes perform all of the logical functions of the switch. When the switch is booted-up or reset, each node executes a dynamic address generation algorithm to select a unique address and resolve any address conflicts with other nodes.

13 Claims, 6 Drawing Sheets

DYNAMIC ADDRESS ALLOCATION WITHIN RF TRUNKING MULTISITE SWITCH

This is a continuation of application Ser. No. 07/658,843, filed Feb. 22, 1991, now U.S. Pat. No. 5,276,442.

RELATED APPLICATIONS

This application is related to the following copending commonly assigned U.S. patent applications.

Application Ser. No. 07/658,799 filed Feb. 22, 1991, which is a continuation-in-part of Application Ser. No. 07/573,977 entitled "Distributed Multisite Coordination System" filed on 28 Aug. 1990 in the name of James L. Teel, Jr.

Application Ser. No. 07/532,164, filed Jun. 5, 1990, entitled "Fail-Soft Architecture for Public Trunking System", now U.S. Pat. No. 5,175,866 (Atty. Dkt. No. 46-72, Client Ref. No. 45-MR-630).

Application Ser. No. 07/658,640, filed Feb. 22, 1991, entitled "Message Bus Slot Update/Idle Control In RF Trunking Multisite Switch", now U.S. Pat. No. 5,253,253 (Atty. Dkt. No. 46-190, Client Ref. No. 45-MR-646).

Application Ser. No. 07/658,798, filed Feb. 22, 1991, entitled "Multisite Switch System Controller Architecture", now U.S. Pat. No. 5,239,538 (Atty. Dkt. No. 46-180, Client Ref. No. 45-MR-647).

Application Ser. No. 07/658,636, filed Feb. 22, 1991, entitled "Protocol Between Console and RF Trunking System", now U.S. Pat. No. 5,206,954 (Atty. Dkt. No. 46-191, Client Ref. No. 45-MR-649).

Application Serial No. 07/658,636, filed Feb. 22, 1991, entitled "Audio Routing Within Trunked Radio Frequency Multisite Switch", now U.S. Pat. No. 5,384,776 (Atty. Dkt. No. 46-194, Client Ref. No. 45-MR-652).

Application Ser. No. 07/658,844, filed Feb. 22, 1991, entitled "Distributed Multisite Switch Architecture", now U.S. Pat. No. 5,392,278 (Atty. Dkt. No. 46-418).

The disclosures of these related copending applications are incorporated by reference.

FIELD OF THE INVENTION

This invention relates to a distributed network of trunked radio transmission systems in which command and audio signals from one radio system are routed by a switch through a distributed network to another system. In particular, this invention relates to the assigning of unique addresses to each node in a distributed architecture switch.

BACKGROUND AND SUMMARY OF THE INVENTION

Multiple-site RF transmission systems broadcast signals from more than one base station. This allows radio communications to cover a larger area than is possible with a single base station.

The present invention relates to a network of several single site trunked radio systems. An example of a single site transceiver system is disclosed in commonly-assigned U.S. Pat. No. 4,905,302, entitled "Trunked Radio Repeater System" and U.S. Pat. No. 4,903,321 entitled "Radio Trunking Fault Detection System" which are incorporated by reference. Digital trunked radio transceivers capable of handling communications between numerous mobile units and dispatcher consoles in a single area are known.

It is generally impractical for a single VHF/UHF RF repeater transmitting site to effectively serve a large geographical area. The broadcast area of a single site is limited by several factors. The effective radiated power of the antenna is subject to legal and practical limits. In addition, natural and man-made topographical features, such as mountains and buildings, that block RF signal from certain locations.

Figure 1:
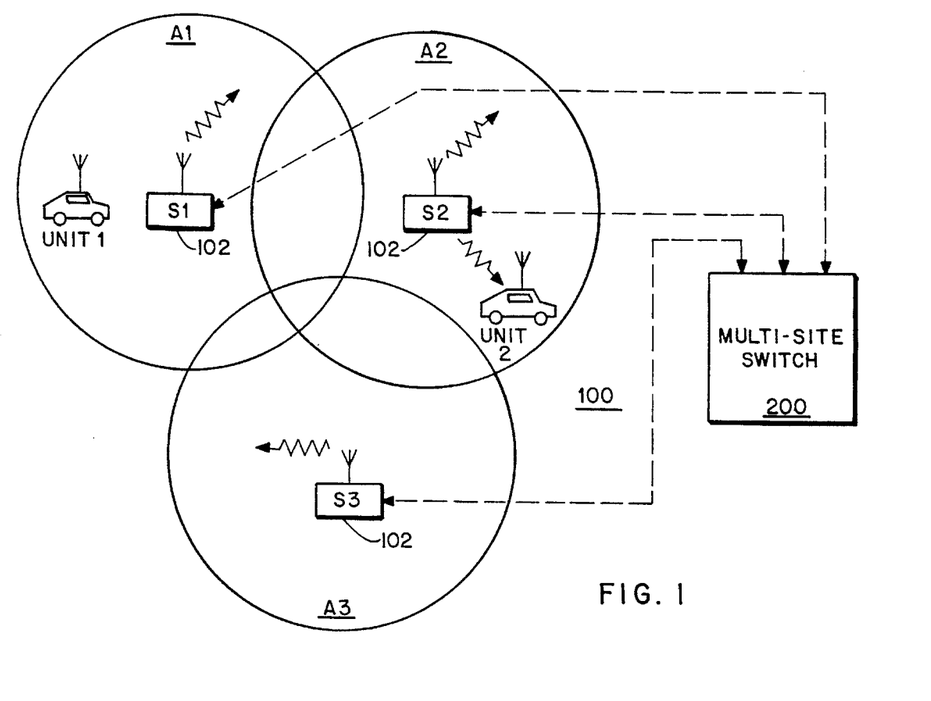
FIG. 1 is an illustration of three site radio system networked together by a multisite switch.

Multiple transmitting sites are necessary to provide RF communications to all locations within a given locality. Multiple transmitters may be needed to cover a rural community covering many square miles or a city having tall buildings that block RF transmissions. FIG. 1 is a schematic diagram of a simplified multiple-site system having three radio repeater (transmitting) central sites S1, S2, and S3 providing communications to geographic areas A1, A2, and A3, respectively. Mobile or portable transceivers within area A1 receive signals transmitted by site S1, transceivers within area A2 receive signals transmitted by site S2, and transceivers within area A3 receive signals transmitted by site S3. Each site has a site controller that acts as a central point for communications in the site. To enable communications from one area to another, a switch networks the radio systems together to establish audio slots connecting one site controller to another. Thus, a caller in one area can communicate with someone in another area.

The present invention is directed to a multisite RF trunked repeater system that allows a caller in one site area (e.g. A1) to communicate with a caller in another area (e.g. A2). In a multisite network, each site assigns a specific channel to a call independently of the channel assignments made by other sites. Thus, a single call may be broadcast from several site transmitters each operating on a different frequency. A central multisite switch routes audio and command signals from one site to another, and to and from dispatcher consoles.

In multisite, the site controller (S1) receives a call from a mobile radio in A1 requesting a channel to communicate with a specific caller. A caller requests a channel simply by pressing the push-to-talk (PTT) button on his microphone. This informs the site controller that a channel is requested. The PTT signal is transmitted to the unit on a control channel that is continuously monitored by the site controller. The site controller assigns a channel to the call and instructs the caller's radio unit to switch from the control channel to the channel assigned to the call. This assigned channel is applicable only within the area covered by the site.

In addition, the site controller sends the channel assignment to the multisite network switch. The switch assigns one of its internal audio slots to the call. The switch also sends a channel request to all other site controllers or to only those site controllers having a designated caller within its area. Upon receiving a channel request, these secondary site controllers assign a channel to the call. Again, each secondary channel is operative only in the area covered by its secondary site controller. Each secondary site controller also sends a channel assignment back to the multisite switch. The switch connects the site controller line carrying the assigned channel to the assigned audio slot. The caller can then communicate with a unit or group in an other area via the multisite switch. The call is initially transmitted to the primary (host) site controller, routed through the assigned audio slot in the switch and retransmitted by the secondary sites on various assigned channels in those other areas.

When the caller ends the call, the primary site controller deactivates the assigned channel for that site and notifies the network switch that the call is terminated. There may be a brief "hang time" after the end of the call during which the channel remains assigned. During this hang time, the call can be rekeyed without going through the channel assignment procedure.

When the call is dropped, the network switch sends an end of call command (slot idle) to the secondary site controllers. A call is terminated in a similar format and operation as the slot assignment. Instead of establishing an audio slot, the end of call command causes the assigned slots and channels to be released.

In addition to providing communications between mobile radio units in different areas, the multisite network switch provides communications between dispatchers in different areas and between dispatchers and mobile radio units in different areas. The dispatcher consoles are connected to the network switch in the same manner as are the site controllers. A dispatcher console can issue a channel call request through the network switch to a site controller in another area to call a mobile unit or to another dispatcher console to call a dispatcher at another console.

In addition to all of the features that the mobile units have, each dispatcher console has the ability to participate in any call in its area or to its assigned groups. Thus, when a call comes through the network switch from another area to a mobile radio, the network switch informs the dispatcher console of the call in addition to notifying the site controller. The dispatcher can listen in or participate in the call to the mobile radio.

The network switch is also capable of handling calls to groups of mobile units and/or dispatcher consoles. The wide area switch manages group calls and monitors the network to ensure that the site controllers for all of the callers in the group assign a channel to the group call. If a channel is not assigned, the wide area switch advises the caller that the wide area call cannot be formed as requested. The caller then has the option of re-keying the call so as to reach those areas having assigned channels.

The present invention relates to a multisite switch having a distributed architecture. The logical functions of the switch are shared by various microprocessor operated nodes distributed throughout the switch. Each node includes a controller card and audio cards. The nodes share the computational workload of the switch. Within the switch, the nodes are coupled to each other by message and audio buses.

The nodes interface the switch with the other radio system components outside of the switch. Each node is connected to a site controller, dispatcher console, the system manager or other component of the overall radio system. The nodes coupled to site controllers are referred to as Master II Interface Modules (MIMs) and the nodes coupled to dispatcher consoles are referred to as Console Interface Modules (CIMs).

Distributed network multisite systems have a much faster data transfer rate than comparable central architecture multisite systems. Central computers process information serially. All communications passing through the switch must be serially processed by the central computer. The central computer slows communications because of its serial operation. Distributed network systems achieve parallel processing by sharing the computational tasks between several processors. Distributed networks are generally significantly faster than central computers.

In the multisite switch, the overall protocol used on the message bus is the carrier-sense multi-access protocol with collision detection (CSMA/CD). This is a peer-to-peer type protocol in which all of the nodes interact as equal logical units in the locate area network (LAN). There is no arbiter unit in the switch to resolve conflicts between nodes. Such an arbiter was undesirable because its failure would disable the entire switch. An underlying design principal of the switch was to eliminate any single unit that could disable the entire switch. Accordingly, there is no arbiter unit in the multisite switch and the switch nodes together and by themselves control the operation of the switch and LAN.

Each node in the switch must have a unique node address. These addresses identify the nodes and address tables in which the node addresses are stored. Messages generally include the address of the node that sent the message so the other nodes can determine the origin of the message. In addition, some messages are intended for certain nodes and these messages include the address of the intended recipient node to ensure that the message is received by the designated node.

In the multisite switch of the present invention, the assignment of node addresses is accomplished through a novel method by which each node assigns itself a randomly-selected address and then broadcasts its address to other nodes to determine whether its address was also selected by another node. If two or more nodes have the same address, then these nodes reassign themselves new addresses. Accordingly, whenever the switch is booted-up or reset, the nodes follow a procedure by which they each allocate themselves a unique address. Similarly, when a new node is added to the switch, it selects its own address and broadcasts this address to other nodes to confirm that its address is unique.

One advantage of this method of assigning node addresses is that it does not require an arbiter unit or other central unit to assign addresses. Similarly, there is no requirement for a human operator to assign node addresses or set up each node individually in some special manner, such as by setting DIP switches. The distributed architecture of the switch is preserved by the present method of dynamically allocating node addresses. There is no multisite switch component that is required to implement the addressing algorithm. The nodes assign themselves unique addresses regardless if any node or other switch component is inoperative. Accordingly, there is no one component that can prevent the dynamic addressing method of the present invention.

DETAILED DESCRIPTION OF THE DRAWINGS

An exemplary trunked radio repeater system in accordance with the invention is generally depicted in FIG. 1.

Individual remote units communicate with each other through shared radio repeaters that are part of the trunked repeater system 100. The system is composed of several sites 102. Each site includes a site transceiver that broadcasts signals over a certain area and a site controller. For example, site S1 broadcasts over area A1. The remote units can communicate with units within their own area or with units in other areas. The remote units also communicate with the dispatcher consoles.

Each site is controlled by a site controller, e.g., S1. The site controller controls the radio frequency data and audio traffic in its area. The site controller is described in more detail in the application and patents previously mentioned. For purposes here, each site controller communicates with the multisite switch 200. The multisite switch routes communications between sites and dispatch consoles.

Figure 2:
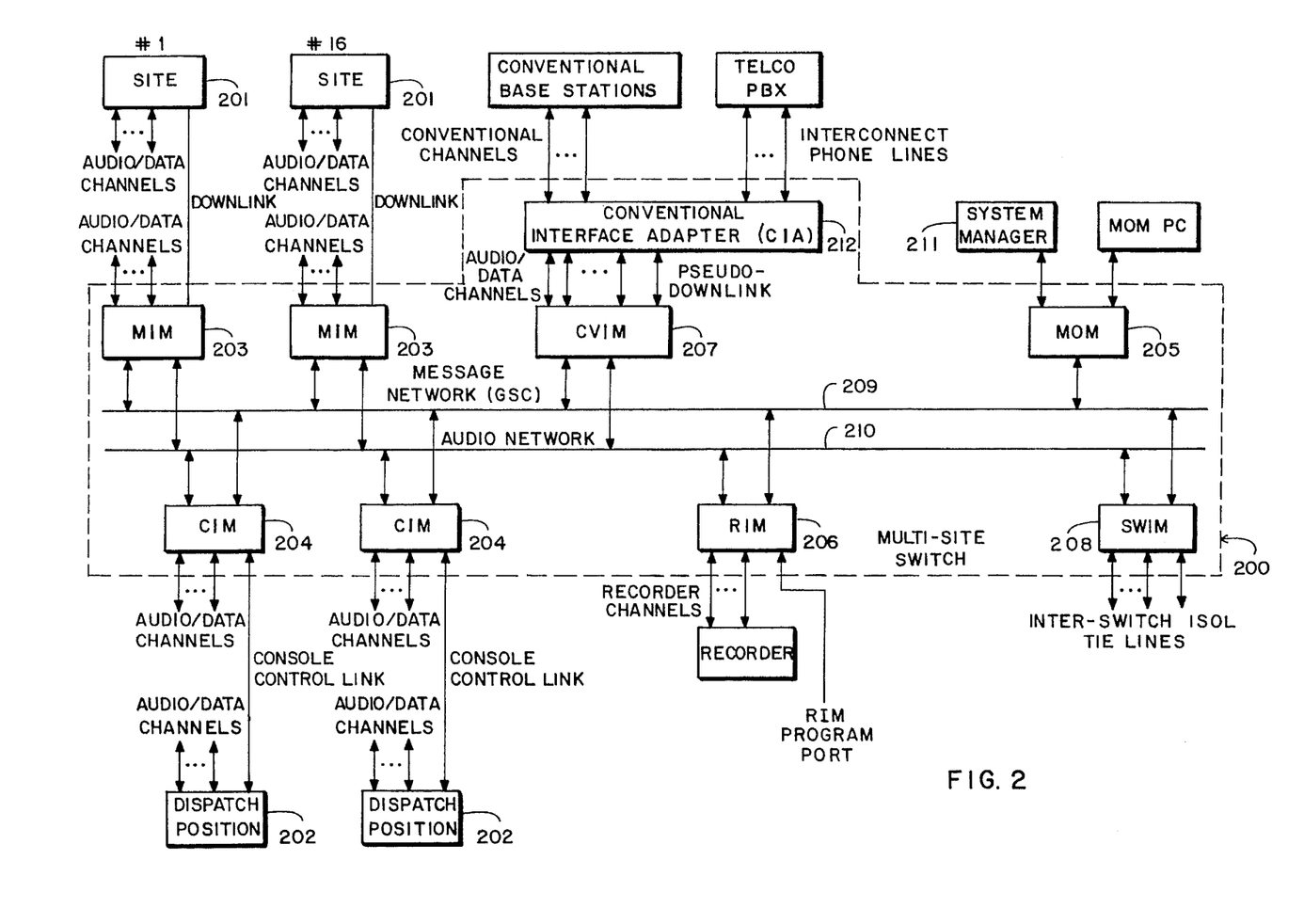
FIG. 2 is a schematic of the architecture for a distributed network multisite.

Communications between sites are conducted through the multisite switch 200 shown in FIG. 2. The multisite switch communicates with each site controller 201 and dispatcher console 202. There are data and audio communication lines between the multisite switch and each site controller and dispatcher console.

The primary responsibility of the multisite switch is to establish and remove audio connections between sites and dispatch consoles. The multisite switch comprises a local area network of nodes. As shown in FIG. 2, the nodes are labelled corresponding to whether they interface with a site controller, dispatcher console or other system component. For example, MIMs 203 are nodes in the switch that interface with site controllers and CIMs 204 are nodes that interface with dispatcher consoles. There are other nodes such as a Monitor Module (MOM) 205, Recorder Interface Module (RIM) 206, Conventional Interface Module (CVIM) 207 and a Switch Interconnect Module (SWIM) 208.

The MOM 205 is the interface for the system manager and the MOM PC (personal computer) that have supervisory responsibility for the switch and overall radio system. The system manager updates the databases in all of the nodes. The MOM maintains certain centralized databases including databases for smart calls and confirmed calls. Smart calls relate to the operation of the dispatcher console. A call is "smart" if the call has been selected, i.e., being listened to by the dispatcher via a select speaker in the console. If the call is not selected by at least one console, then a flashing indicator light appears on certain consoles. Thus, several dispatchers can readily see which calls are not being monitored by at least one dispatcher. Confirmed calls require participation of all of the intended callers. A confirmed call can begin audio transmission only after all of the sites having intended callers have confirmed the assignment of channels the call.

Each node in the multisite switch is supported by a microprocessor controlled communications card. All of the cards for the MIMs, CIMs, CVIM, MOM, RIM and SWIM have the same hardware and are interchangeable. The cards are said to have different personalities to indicate that they are assigned to, for example, a site controller or a dispatcher console (dispatch position). Each card can be easily configured to be a MIM, CIM, etc., by setting a few switches on the card. Thus, the cards are truly interchangeable.

The nodes of the switch are each connected to a digital message bus 209 and one or more digital audio buses 210. The message bus 209 is shown in FIG. 2 as a message network using an Intel 80C152 Global Serial Channel (GSC) microcontroller. This GSC microprocessor is the communications controller in the controller card in each node. The message bus is a high speed data bus that resides in the GSC microcontroller. The message bus interconnects the interface processors in the controller card of each node.

The audio bus 210 comprises 32 time division multiplexed buses. Each bus contains 32 slots that each carry a single audio channel. A maximum of 1024 audio slots may be routed through the switch (32 buses×32 slots). The slots are assigned to individual nodes and are coupled to the audio boards in the nodes. The operation of the audio slots and the audio boards are described in more detail in Application Ser. No. 07/658,363, entitled "Audio Routing Processing Architecture Within Trunked Radio Frequency Multisite Switch", now U.S. Pat. No. 5,384,776 which is further identified above.

Figure 3:
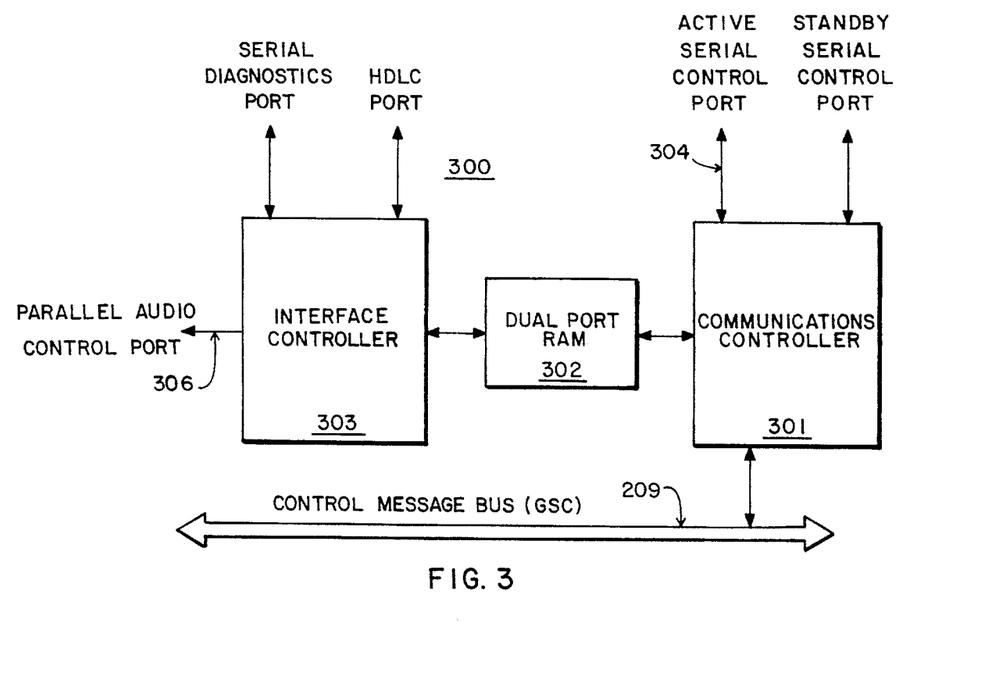
FIG. 3 is a block diagram of the switch controller card.

FIG. 3 shows a block diagram of one of the cards 300. This diagram is applicable to all of the nodes of the switch except for the conventional interface adapter (CIA). Thus, the hardware for the MIM, CVIM, MOM, SMIM, RIM and CIM is a switch controller card. Each card includes a communications controller 301, a dual-port random-access-memory (RAM) chip (302) and an interface controller 303.

The communications controller 301 is a message router. It routes messages between the control message bus 209, the serial port leading outside of the switch 304, the message bus in the switch and the interface processor 303 in the node through the dual-port RAM 302. The communications controller is coupled to the GSC message bus 209. This controller places messages onto the bus and receives messages from the bus. Messages received from the site controller over the serial port 304 are translated into a format usable by the multisite switch. The communications controller also translates switch messages into a format that the site controller understands.

The interface processor 303 performs substantially all logical functions for the node. In effect, the interface controller is the intelligence for the node. The interface processor, in this embodiment, is an Intel 80C186 microprocessor. The interface processor acts as a switch for the audio network and assigns audio switch slots to active audio site channels by operating the audio boards in the node via the parallel audio data/control port 306.

Each call through the switch is assigned a slot by the host MIM or CIM on the audio bus. When the call is terminated, the host cancels the call and makes the slot available for assignment to another call. The interface processor for each MIM assigns slots, connects audio slots to the site controller or dispatcher console to establish a communications link, and terminate slots. Since all MIMs and CIMs perform these functions, they must continually inform each other and the other nodes of their slot assignments. Accordingly, the MIMs and CIMs send messages regarding slot assignments, slot updates and slot idles over the message network 209 to other nodes.

The communications controller 301 for each secondary node initially processes all of the messages on the message network. Slot assignments are forwarded to the interface processor through the dual-port RAM. Redundant slot update/slot idle messages are not forwarded to the interface processor by the communications controller. Messages regarding slot updates or idle slots are processed by the communications controller by referring to a slot bit map located in the dual-port RAM storage 302. Update messages are sent periodically by a primary (host) MIM to confirm to the other nodes the active status of a slot. When a primary MIM terminates a call it sends a slot idle message to the other nodes. The primary MIM also periodically resends idle messages until the slot is reassigned to another call. Thus, all nodes are continually informed of the status of all slots that have been assigned at least once. Until a slot is initially assigned to a call, its host node does not send any messages regarding the status of the slot.

When the multisite switch is initially booted-up or reset, the nodes each select a unique address and broadcast their addresses to the other nodes over the message bus. If two or more nodes select the same address, then the nodes broadcast address denials over the message bus. In response to the address denials, these nodes randomly select new addresses and repeat the address broadcast and, if necessary, the address denial procedure.

The procedure for selecting node addresses has two main phases. In the first phase, the nodes each select and broadcast their addresses. In addition, nodes resolve any address conflicts during the first phase. The first phase does not end for a node until a waiting period passes during which the node receives no address denials or address request messages pertaining to its own address. This waiting period is measured by a time-out timer. The first phase ends for each node when its time-out timer expires.

The first phase of address allocation ends at different times for different nodes. If a node does not receive any address requests or address denial messages that match its address, its time-out timer will expire relatively quickly and end the first phase. In contrast, a node that selects an address selected by another node will receive an address denial or address request message for its address from the other node. These denials or requests cause the node to restart its time-out timer. The first phase is extended each time the time-out timer is reset. The time-out timer will not expire until address conflicts for the node have been resolved. Accordingly, the first phase for this node is extended for a relatively long period of time because the timer is reset each time there is an address conflict.

The first phase will end at different times for different nodes. A node that initially selects a unique address will exit the first phase before a node that selects the same address as does another node and must resolve the address conflict. It is desirable for all nodes to exit the dynamic addressing procedure at approximately the same time. Accordingly, there is a second phase during which a node waits for all other nodes to complete address selection. This second phase ensures that a late-acting node does not belatedly select the same address as that of a node already out of the first phase.

Each node enters the second phase immediately after the timer for the first phase expires. During the second phase, each node waits for a timer to expire, late-coming address requests and address denials, and for receipt of an address initialization complete message. If a node in the second phase receives an address request or denial, then it restarts the second-phase waiting period and checks whether the the request or denial corresponds to its address. If there is an address conflict, then the node starts the first phase again and selects a new address.

When the timer for the second phase expires or the node receives an initialization complete message, then the node exits the dynamic address allocation procedure.

Initialization-complete messages signify that all addresses have been assigned and that all nodes can leave the address allocation routine. In the preferred embodiment, the node with the lowest address is arbitrarily selected to broadcast an initialization-complete message. This lowest address node broadcasts the initialization-complete message when that node's second phase timer expires. The initialization complete message ensures that all nodes in the switch will exit the address allocation procedure no later than does the lowest addressed node.

It is preferable that the number of switch nodes be less than one-half the number of potential addresses. For example, if the address range is zero to 240, then there should be less than 120 nodes. This ensures that a randomly-selected address has at least a 50% probability of producing a unique address. This relatively-high probability ensures that the address selection algorithm will terminate within a reasonable period of time and will not be unnecessarily prolonged by an excessive number of address conflicts.

Furthermore, the nodes are receptive to address announcements, e.g., address request messages, at any time during the operation of the switch, including after address initialization is completed. This ability to handle address announcements allows a new node to enter the network at any time and select a unique address. A new node addition does not require existing nodes that have completed the dynamic addressing algorithm to restart the algorithm and select new node addresses. Rather, existing nodes will respond to the address request and, if necessary, deny the new node from using the same address.

Figure 4:
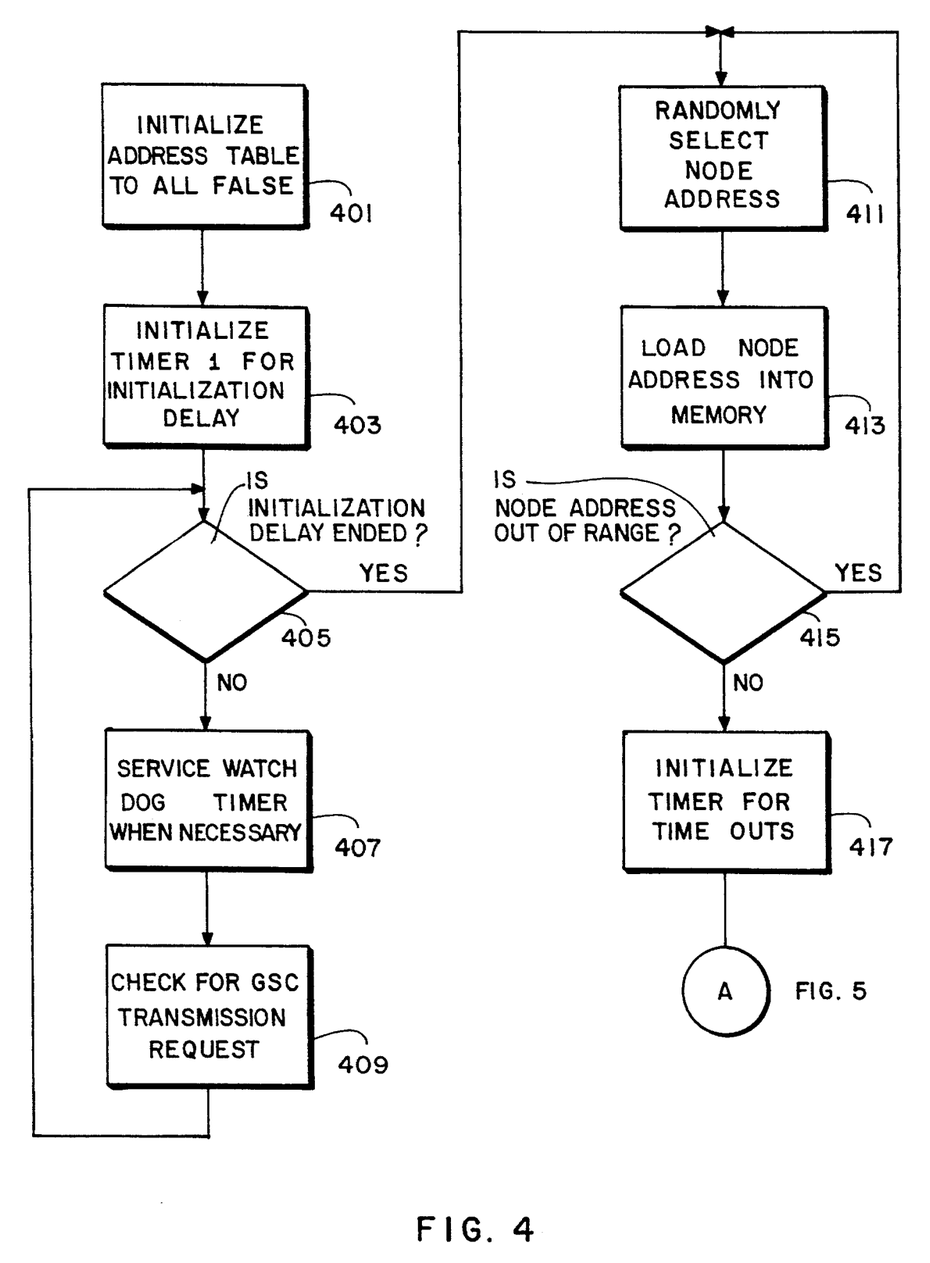
FIG. 4 is a flow chart showing the beginning steps of the dynamic address generation procedure.

FIG. 4 shows a flow chart of the steps followed by each node in commencing the dynamic address allocation algorithm. The algorithm is executed by the communications controller 301 of each node and is stored in non-volatile memory associated with this controller. In the preferred embodiment, the non-volatile memory is a programmable read-only memory device (PROM). The address table for each node is generated as each node selects and broadcasts its address selection. In the preferred embodiment, the address table is stored in random access memory (RAM). The communications controller calls up the address allocation algorithm when the processor boots-up or is restarted.

In step #401, the communications controller initializes the address table by setting all address to false. This clears the table and assures that no spurious preexisting data in the table is later mistaken for a node address. In step #403, a timer for the communications controller is initialized for a certain period of time referred to as the initialization time. The initialization time is a brief delay that allows all of the nodes on the switch to commence the first phase of the address allocation procedure at about the same time.

During the initialization delay, the communications controller services, i.e., resets, the watch-dog timer from time to time in step #407. In the preferred embodiment, the watch-dog timer is reset every 0.48 seconds. The watch-dog timer is an external timing device that resets the interface processor if the controller does not reset the watch-dog timer before it expires. The watch-dog timer reset routine is part of the programmed routine of the controller. If the processor does not reset the watch-dog timer, then the watch-dog timer automatically resets the processor. In addition to the watch-dog timer, the processor checks whether any GSC message bus transmissions have been received by the communications controller in step #409.

When the initialization delay ends or a message is received, the communications controller randomly selects an address for its node in step #411 and loads this address into a memory RAM location in step #413. The processor confirms that the address is within the range allocated for individual node addresses in step #415. In the preferred embodiment, individual node addresses can be in the range between 0000 and OEFH. If the address is outside this allocated range, then another address is selected by the controller. After selecting an address, the communications controller initializes a timer for counting time-out periods and, thus, begins the first phase of the address generation procedure.

Figure 5:
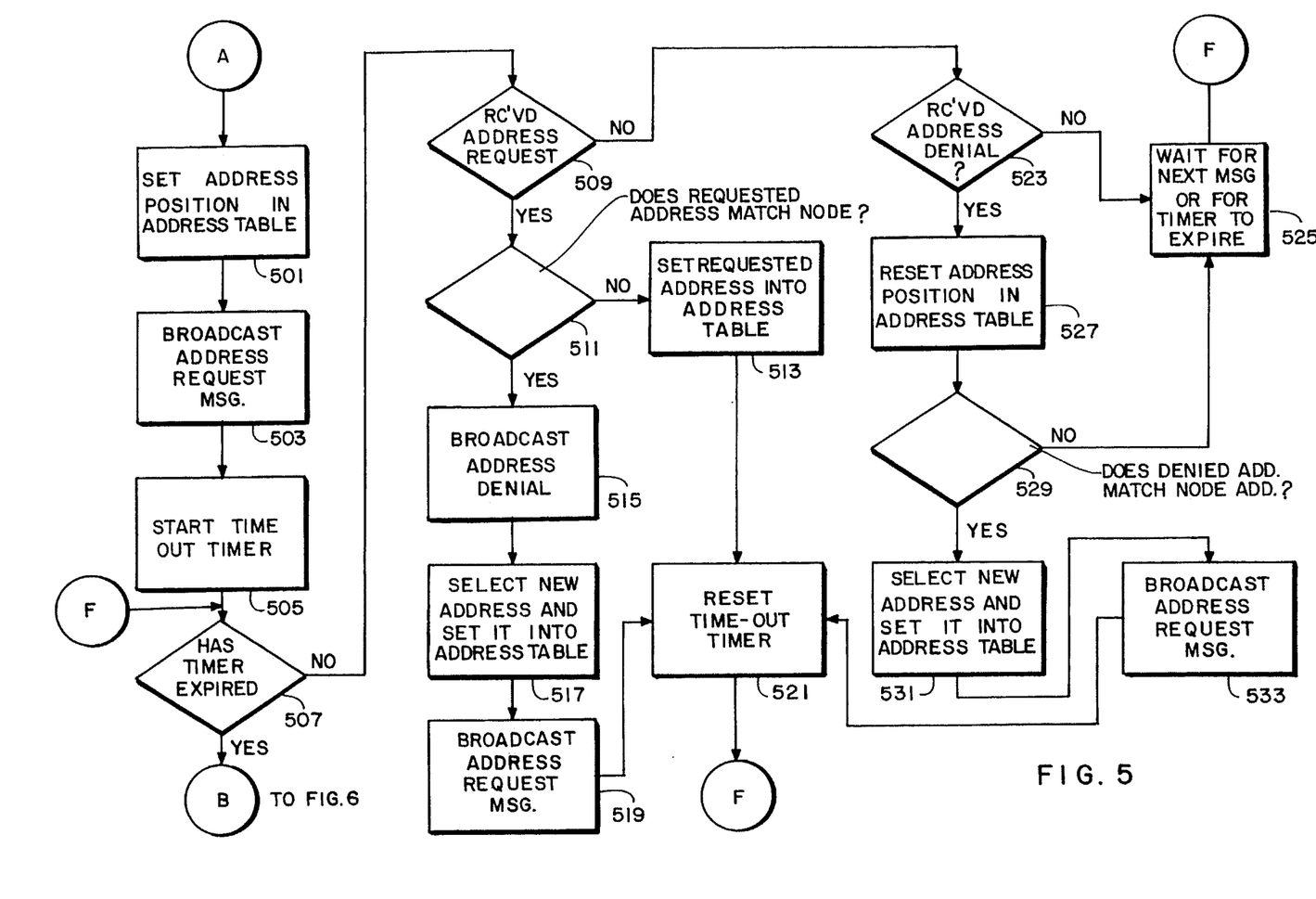
FIG. 5 is a flow chart showing the steps for initially broadcasting address requests and receiving address request from other nodes in the switch.

FIG. 5 is a flow chart showing the steps followed during the first phase of the address allocation algorithm. In step #501, the address selected by the node is moved from memory in the communications controller and set into an address table in the random access memory. This address table, when complete, will include the addresses of all of the nodes. Initially, the address table contains only the address selected by its node.

Having selected an address, the node must determine whether its address is unique. Accordingly, the communications controller broadcasts an address request message by loading the message into dual-port RAM and setting an interrupt to notify the interface processor that it has a message. The interface processor recognizes this message as a GSC message bus output type. The interface processor sends the message to the GSC message bus by routing it backthrough the communications controller by loading the message into the dual-port RAM and setting an interrupt to notify the communications controller that it has a message. The controller retrieves the message and broadcasts it on the message bus in step #503. The address request identifies the node and the address that it has selected.

In the preferred embodiment, the address request message is as shown in Table A.

TABLE A

| | ADDR_RQST (119) | |
|---|---|---|
| #Bytes | Field | Function |
| (1) | message_id | ADDR_RQST |
| (1) | node_id | potential node id |

The message is received and processed by every node in the switch. In each node, the communications controller receives the message from the message bus, places the message in the dual-port RAM, and sets an interrupt notifying the interface processor that the message is waiting. The interface processor retrieves the message and returns it through dual-port RAM to the communications controller which processes it as is described below. Nearly all other messages generated in the node are formed by the interface processor and passed to the communications controller via the dual-port RAM. Similarly, most types of messages received by the communications controller and, delivered to the interface processor via the dual-port RAM.

Having broadcast its address request, the node waits to see if it receives an address denial and other address requests. In step #505, the node starts the time-out timer and waits for it to expire in step #507. If, during the time-out period, the watch-dog timer needs to be serviced, it is. In addition, the communications controller waits for messages from the message bus. If a message is received and it is an address request from another node, step #509, then the processor compares the requested address against its own address to see if the addresses match in step #511. If the addresses do not match, then the address of the other node is set in the address table. In this way, the communications controller fills out its address table with the addresses of all of the nodes.

If the node addresses match, then the subject node has the same address as selected by another node. The subject node broadcasts an address denial in step #515 to notify the other node to select another node.

In the preferred embodiment, the address denial message is as shown in Table B.

TABLE B

| | ADDR_DENIAL (120) | |
|---|---|---|
| #Bytes | Field | Function |
| (1) | message_id | ADDR_DENIAL |
| (1) | node_id | conflicting node id |

In addition, the subject node selects another address and sets its new address into its address table in place of the old address in step #517. When there is an address conflict between two or more nodes, neither node retains the address and both select new addresses. The newly-selected address of the node issuing the denial message is broadcast to all other nodes through an address request in step #519 and the time-out timer is reset to restart the waiting period in step #521. The node then waits to see whether its new address conflicts with the address of any other node.

In addition to looking for address requests, the node also looks for address denial messages during the first phase waiting period in step #523. If neither such message is received, then the controller continues to wait for the time-out timer to expire in step #525 to end the first phase of the address generation procedure. If an address denial message is received, then, in step #527, the communications controller resets to false the node addresses in the address table that correspond to the denied address.

In step #529, the communications controller checks whether the denied address matches the address of its node in step #529. If the addresses do not match, then the processor continues waiting for another message and the time-out timer to expire. If the addresses match, then the processor selects a new address and sets it into the address table in step #531. The new address is broadcast to the other nodes in an address request message in step #533, and then the time-out timer is restarted. The first phase ends for a node when its time-out timer expires. Generally, by the end of the time-out, there is a fair degree of certainty that the node has selected an address that is unique to the addresses of the other nodes.

Figure 6:
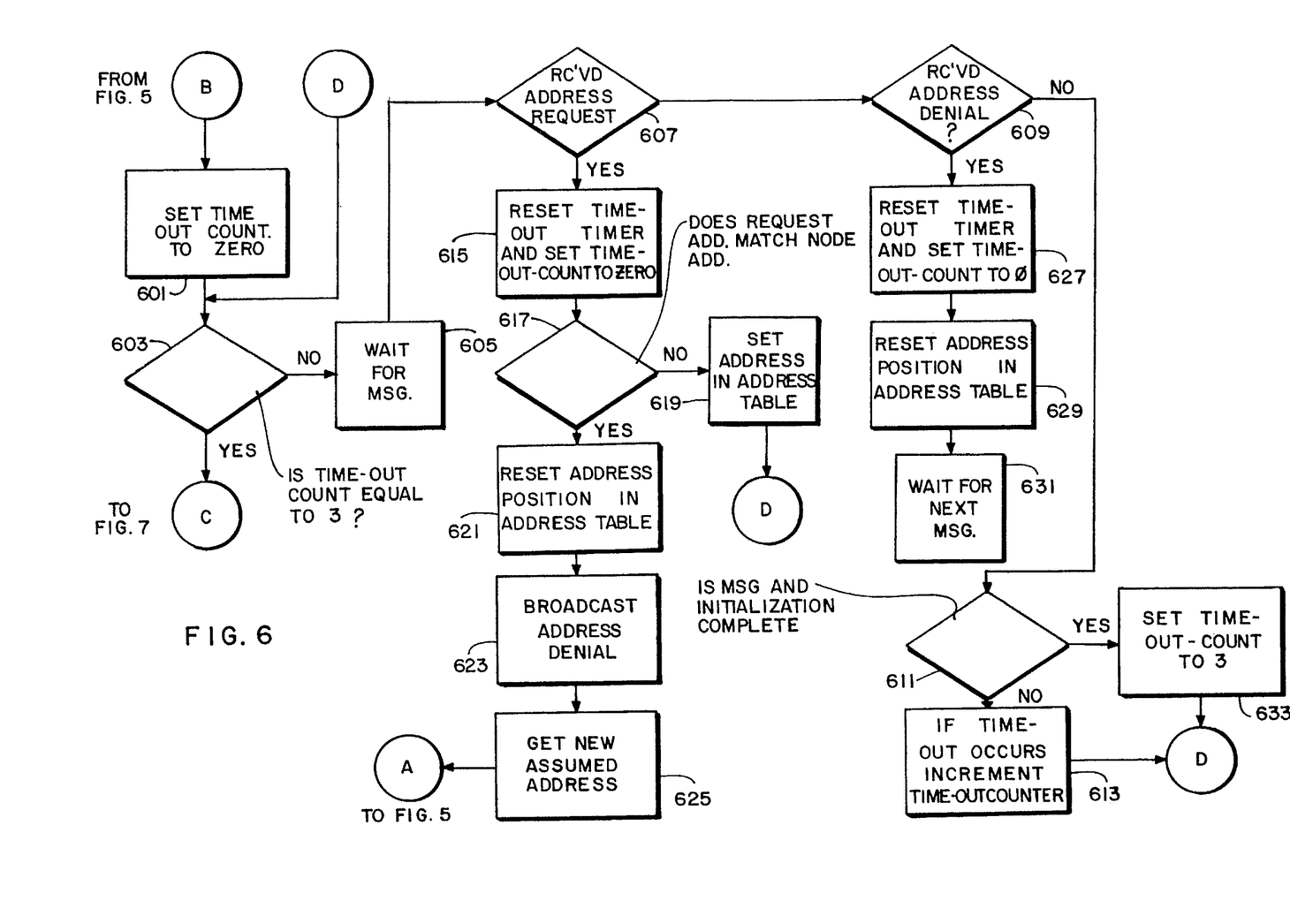
FIG. 6 is a flow chart showing the steps for waiting for the elapse of a time-out period signifying that all nodes have selected a unique address.

However, after a node has completed the first phase, there is a chance that another node will select its address. Accordingly, the address generation algorithm has a second phase that is represented in FIG. 6. During the second phase, each node waits a relatively-long period of time for any late-coming address requests or address denials. In the preferred embodiment, the waiting period for the second phase is three times as long as the time-out period in the first phase. The purpose of the second phase is to ensure that all nodes have selected unique addresses before any node completes the addressing procedure.

In step #601, the communications controller resets the time-out timer and sets the time-out count to zero. The second phase ends when three time-outs occur or when another node broadcasts an initialization is complete message. In step #603, the processor checks whether the time-out count is at three. If the count is lower than three, then the processor services the watch-dog timer when necessary and waits for a message in step #605. If a message is received, the processor looks to see if the message is for an address request in step #607, an address denial in step #609, or an initialization is complete in step #611. If no such message is received, then the processor waits to increment the time-out counter each time the time-out timer expires in step #613.

If an address request is received, then the timer is reset and the time-out counter is set to zero in step #615. This restarts the second phase of the address generation program. The second phase requires that a certain period of time occurs, e.g., three time-outs, during which no address request or address denial message is received at the node. After restarting phase two, the processor determines whether the requested address is the same as its own address in step #617. If the addresses do not match, then the newly-received address is loaded into the address table in the RAM on the node in step #619.

If there is an address conflict between the requested address and the subject nodes address, the node sets its own address to false in its address table in step #621, and broadcasts an address denial message in step #623. The communications controller selects a new address in step #625 and returns to phase one to verify that its new address is unique.

If, in the second phase, the processor receives an address denial, it resets the time-out timer and counter to restart phase two in step #627. The denied address is reset in its address table in step #629 and the processor waits for time-outs and new messages in step #631. There is no need to check that the denied address is its address, because any address denial message would have been received in the first phase after the address request message had been broadcast by the node. By the second phase, a node should not receive address denials for its own addresses.

Finally, if the message received is an initialization is complete message, the processor sets the time-out count to three in step #633 to exit the second phase. By the end of phase two for any node, all nodes should have selected a unique address.

Figure 7:
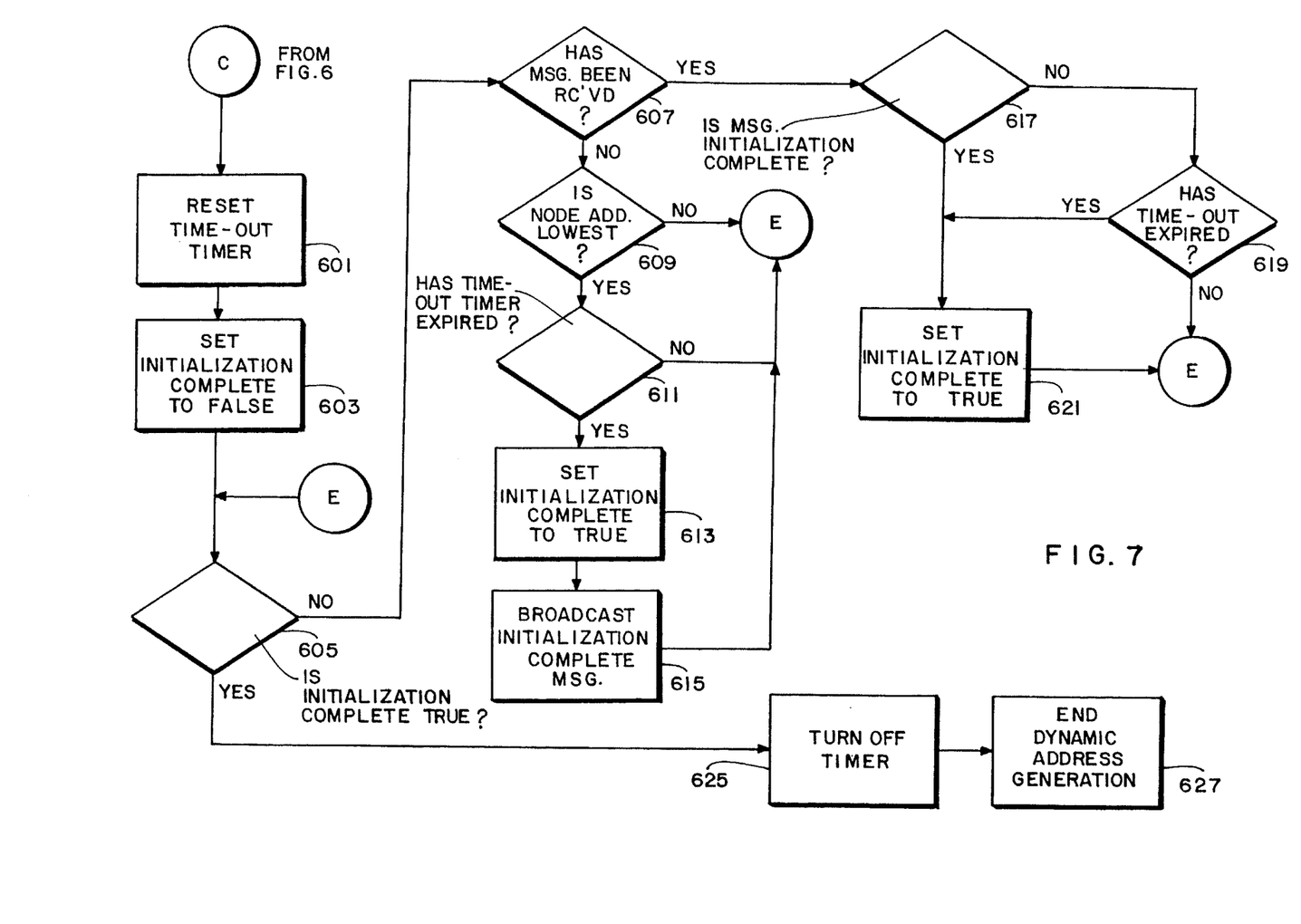
FIG. 7 is a flow chart showing the steps in completing the dynamic address allocation procedure.

FIG. 7 is a flow chart of the steps for the completion of the dynamic address generation algorithm. To complete address selection, each node waits for a short period of time to allow the other nodes to complete address selection at about the same time. Accordingly, in step #601, the communications controller resets its time-out timer and sets the initialization complete logic to false in step #603. When the initialization complete is set to true because the timer expired or a completion message is received, the processor will, in step #605, complete this last delay period.

During this last delay, the processor services the watchdog timer when necessary and checks for messages in step #607. If no message is received, the processor determines whether its node is the node to issue the completion message. In the preferred embodiment, the node with the lowest address was arbitrarily selected as the node to broadcast the completion message.

In the preferred embodiment, the initialization is complete message is as shown in Table C.

TABLE C

| | INIT_COMP (121) | |
|---|---|---|
| #Bytes | Field | Function |
| (1) | message_id | INIT_COMP |

Thus, in step #609, the processor checks whether its node has the lowest address. If so, then the processor waits for its timer to expire in step #611. When the timer expires, the initialization complete logic is set to true in step #613, and an initialization complete message is broadcast to the other nodes in step #615. In this way, all of the nodes receive a completion message at about the same time.

All nodes decide whether a received message is a completion message in step #617. If a completion message is not received, the interface processor waits until a time-out occurs in step #691 and then sets the initialization complete logic to true in step #621. Similarly, if a completion message is received from the lowest address node, then the initialization complete logic is also set to true.

When the initialization complete becomes true, the processor turns its time-out timer off in step #625, and then exits the dynamic address allocation algorithm in step #627.

While the invention has been described in connection with what is presently considered to be the most practical and preferred embodiment, the invention is not limited to the disclosed embodiment. On the contrary, the invention covers various modifications and equivalent arrangements included within the spirit and scope of the appended claims.

What is claimed is:

1. A method of operating an RF trunking multisite switch for coordinating radio communications between plural repeaters located in different geographical areas which control RF communications between plural RF transceivers, said switch having a distributed architecture of nodes operatively coupled to a message bus and a time division multiplex audio bus having multiple audio channels wherein each node comprises a computer controller and an associated memory unit having an address table, said method comprising the steps of:

a. assigning a node to each of the repeaters located in different geographical areas, each node processing communications with its assigned repeater;

b. each node automatically selecting a requested address from a plurality of possible addresses for identifying that node on the message bus and broadcasting that address to the other nodes over the message bus;

c. upon receiving an address request broadcast by another node, each node comparing the broadcast address to its own address, and broadcasting an address denial message over the message bus to the another node when the compared addresses are the same;

d. when each node receives an address denial message for its requested address, returning to step (b), automatically selecting another address, and broadcasting the another address to other nodes; and e. writing selected addresses associated with all nodes for which an address denial message is not broadcast in the address table of each node, wherein communications are routed between RF transceivers in different geographical areas through the switch, using one of the multiple audio channels on the time division multiplex bus, to nodes corresponding to the repeaters located in those different geographical areas based on the addresses in the address tables of each node.

2. The method according to claim 1, wherein each repeater coordinates RF communications of mobile transceivers in an associated geographic area which partially overlaps geographic areas associated with other of the repeaters.

3. In an RF thinking multisite switch for enabling radio communications between plural site transceiver stations located in different geographical site areas which control RF communications between plural RF mobile/portable radios located in those different geographical site areas so that one radio in one geographical site area may communicate with another radio in another geographical site area, each site transceiver station having plural transceivers and a site controller and said switch having a distributed architecture of nodes operatively coupled to a message bus and a time division multiplex bus, a method comprising the steps of:

assigning a node to each of the site transceiver stations, each node controlling communications between said switch and its site transceiver station; and each node automatically selecting a node address from one of a plurality of possible node addresses and broadcasting a requested address message including the selected node address to the other nodes over the message bus, wherein upon receiving the requested address message broadcast by another node, each node compares the broadcast address to its own address, and broadcasts an address denial message over the message bus to the another node when the compared addresses are the same.

4. The method according to claim 3, further comprising:

when the another node receives the address denial message for its requested messaging address, returning to step (b), automatically selecting another node address, and broadcasting another messaging address to the other nodes over the message bus.

5. The method according to claim 4, further comprising the step of:

e. writing selected node addresses that have not been denied in an address table of each node.

6. The method according to claim 5, further comprising the step of:

routing messages to specific nodes using the node addresses stored in the address table.

7. A multisite trunked radio communications system, comprising:

plural mobile/portable RF radios;

plural base stations located in different corresponding geographical areas, each base station including plural transceivers for controlling RF communications with one or more radios in the base station's corresponding geographical area;

a multisite switch for muting radio communications between the base stations so that radios in different geographical areas can communicate including:
a message bus;
a time division multiplex bus having multiple channels; and
a distributed architecture of nodes, each node having a computer and operatively coupled to the message bus and the time division multiplex audio bus and being assigned to and interfacing communications with one of the base stations, wherein each node automatically determines its own node address from a plurality of possible node addresses to be used in routing signals on the massage bus or the time division multiplex bus to that node, transmits over the message bus a requested address message including the determined node address to the other nodes, compares an address included in received address message requests transmitted over the message bus to its own node address, and transmits an address denial message over the control message bus when compared addresses are the same.

8. The system according to claim 7, wherein each node generates a different messaging address if an address denial message is received over the control message bus and transmits the different address message to the other nodes.

9. The system according to claim 8, each node further comprising:

a memory for storing node generated addresses which were not denied in an address table.

10. The system according to claim 7, wherein each node generates its own address randomly.

11. A multisite trunked radio communication system, comprising:

plural mobile/portable RF radios;

plural trunked radio sites including plural transceivers located in different corresponding geographical areas RF communications with one or more radios in the site's corresponding geographical area, a specific communication channel being assigned to a communication involving a radio in the site's corresponding geographical area independently of communication channel assignments in other sites; and a multisite switch having a distributed architecture for networking the sites together to dynamically establish an audio channel connecting one site with one or more other sites so that a radio in one geographical area may communicate with another radio in another geographical area including:

a message bus;

a time division multiplex bus having multiple channels for routing audio and data signals from one site to another site;

plural nodes, each node having a computer and operatively coupled to the message bus and the time division multiplex bus and being assigned to and interfacing communications with one of the sites, wherein each node dynamically generates an address, transmits over the message bus a requested address message including the generated address to the other nodes, compares address message requests received from over the message bus to its own address transmits an address denial message over the message bus when compared addresses are the same, and adopts the generated address if an address denial message is not received over the message bus within a preset time after the requested address memory is transmitted, and wherein a communication between radios located in different geographical areas is routed through the switch over one of the channels on the time division multiplex bus to/from nodes corresponding to the base stations in those geographical areas using the node generated addresses.

12. The system according to claim 11, wherein each node generates its own address randomly.

13. A system according to claim 11, wherein each node generates a different message address when the address denial message is received over the message bus and transmits the different address message to the other nodes.'

* * * * *